United States Patent
Sugita et al.

(10) Patent No.: US 6,723,463 B2
(45) Date of Patent: Apr. 20, 2004

(54) FUEL CELL STACK HAVING TERMINAL ELEMENT LOCATED AT SPECIFIED LOCATION

(75) Inventors: Narutoshi Sugita, Wako (JP); Yoshinori Wariishi, Wako (JP); Minoru Koshinuma, Wako (JP); Takashi Komura, Wako (JP); Hidemitsu Ono, Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 79 days.

(21) Appl. No.: 10/022,589

(22) Filed: Dec. 17, 2001

(65) Prior Publication Data
US 2002/0127463 A1 Sep. 12, 2002

(30) Foreign Application Priority Data

Dec. 18, 2000 (JP) .......................................... 2000-383552
Dec. 4, 2001 (JP) .......................................... 2001-370430

(51) Int. Cl.$^7$ ................................................ H01M 2/14
(52) U.S. Cl. ............................. 429/38; 429/34; 429/35; 429/37
(58) Field of Search ............................... 429/34, 35, 37, 429/38

(56) References Cited

U.S. PATENT DOCUMENTS

| | | | | |
|---|---|---|---|---|
| 4,708,916 A | * | 11/1987 | Ogawa et al. ................. | 429/38 |
| 5,534,362 A | * | 7/1996 | Okamoto et al. .............. | 429/32 |
| 5,750,280 A | * | 5/1998 | Akagi ........................ | 429/32 |
| 6,248,466 B1 | * | 6/2001 | Takahashi et al. ............ | 429/38 |

FOREIGN PATENT DOCUMENTS

| JP | 58-194262 | * 11/1983 | ............ H01M/8/24 |
|---|---|---|---|
| JP | Sho 61-284064 A | 12/1986 | |
| JP | Sho 62-116584 A | 10/1987 | |
| JP | Sho 62-243259 | 10/1987 | |
| JP | Sho 64-48381 A | 2/1989 | |
| JP | Hei 6-290803 A | 10/1994 | |
| JP | Hei 8-171926 A | 7/1996 | |
| JP | Hei 11-224684 A | 8/1999 | |
| JP | Hei 11-273706 A | 10/1999 | |

* cited by examiner

*Primary Examiner*—Patrick Ryan
*Assistant Examiner*—Dah-Wei D. Yuan
(74) *Attorney, Agent, or Firm*—Lahive & Cockfield, LLP; Anthony A. Laurentano

(57) ABSTRACT

The present invention provides a fuel stack comprising: a plurality of fuel cell units stacked together in a direction of stacking each of which comprises an electrolyte element, a pair of electrodes holding the electrolyte element therebetween, and a pair of separators holding the electrodes therebetween; a pair of terminal plates each of which is disposed outside an end fuel cell unit located at an end of the stacked fuel cell units; and a terminal element extending outwardly in the direction of stacking from the outside surface of at least one of the terminal plates; wherein the location from which the terminal element extends is located within an area on the terminal plate, corresponding to an area in a passage for an oxidizing gas formed in the end fuel cell unit disposed adjacent to the terminal element where the partial pressure of water vapor is lower than the saturated water vapor pressure. More preferably, the terminal element is disposed as close to the centerline of the terminal plate as possible so that the total electrical resistance of the terminal element and the terminal plate is minimized. By this configuration, an increase in the total electrical resistance and water vapor condensation in the fuel cell units located at the ends of the stack may be prevented.

10 Claims, 7 Drawing Sheets

DIRECTION OF STACKING

FUEL CELL STACK HAVING TERMINAL ELEMENT LOCATED AT SPECIFIED LOCATION

BACKGROUND OF THE INVENTION

1. Field of the Invention

This invention relates to a fuel cell stack, and more particularly relates to a technology which can prevent a degradation in the power generation performance of fuel cell units disposed at both ends of the fuel cell stack.

2. Background Art

A solid polymer electrolyte fuel cell unit, as an example of a fuel cell, comprises: a solid polymer electrolyte membrane, i.e., a cation-exchange membrane; an anode electrode and a cathode electrode which together hold the solid polymer electrolyte membrane therebetween; and a pair of separators which hold the anode and cathode electrodes.

A plurality of solid polymer electrolyte fuel cell units are stacked together to form a fuel cell stack for actual usage.

In such a fuel cell stack, hydrogen gas, as an example of a fuel gas supplied to the anode electrode, is ionized on a catalytic electrode, and moves to the cathode electrode through the solid polymer electrolyte membrane which is moderately moistened. The electrons produced during this process are sent to an exterior circuit, and used as DC energy. At the cathode electrode provided with oxygen gas or air, as an example of an oxidizing gas, water is produced through the reaction of the hydrogen ions, the electrons, and oxygen.

When the fuel cell stack is used in a vehicle, specifically in a passenger car, it is typically disposed under the passenger's compartment; therefore, the height of the fuel cell stack is tightly restricted.

As a measure to minimize the height of a fuel cell stack, a fuel cell stack is known which has an internal manifold structure in which a plurality of fuel cell units are stacked together in the horizontal direction, and each of the separators is provided with communication ports to form supply ports for a fuel gas, an oxidizing gas, and the like when being assembled (for example, Japanese Unexamined Patent Application, First Publication No. Hei 8-171926).

An example of a fuel cell stack which has this structure will be explained below with reference to FIG. 12. In FIG. 12, reference symbol 1 indicates a fuel cell stack. The fuel cell stack 1 is formed with a plurality of fuel cell units 2 stacked together in the horizontal direction. Each of the fuel cell units 2 comprises: a solid polymer electrolyte membrane; an anode electrode and a cathode electrode which together hold the solid polymer electrolyte membrane therebetween; and a pair of separators which hold the anode and cathode electrodes. Communication ports (not shown) allowing a fuel gas, an oxidizing gas, and a cooling fluid to flow therein are formed in each of the anode electrode and the cathode electrode as through holes; thus, internal manifolds are formed when being assembled.

Each of the fuel cell units 2 is fastened to the others by stud bolts 4.

A fastening structure 5 including coned disc springs or the like is provided at one end of the fuel cell stack 1, in the direction of stacking, and another fastening structure 6 including washers or the like is provided at the other end thereof By means of these fastening structures, the required fastening force is applied to each of the fuel cell units 2 each of which forms a power generation part.

Fuel cell units 2a and 2b located at the ends of the fuel cell stack 1, in the direction of stacking, are provided with terminal plates 7 made of copper which contact their outside surfaces. Each of the fastening structures 5 and 6 is disposed outside each of the terminal plates 7 with an insulation plate 8 therebetween.

A terminal element 9 for outputting electric power extends from the upper portion of each of the terminal plates 7, is bent at a point, and further extends toward the end of the fuel cell stack 1.

SUMMARY OF THE INVENTION

Although the fuel cell stack 1 formed as described above is superior in that its height can be minimized as compared to the case in which external manifolds are provided, the space around the fuel cell stack 1 is limited because the terminal elements 9 vertically extend from the fuel cell stack 1.

In addition, because the terminal elements 9 are located near the periphery of the terminal plates 7, the electric resistance tends to be greater as compared to the case in which the terminal elements 9 are located near the centerline of the terminal plates 7.

In order to overcome the above problem, i.e., to minimize the space occupied by a fuel cell stack in both the direction of stacking and the height while maintaining power efficiency, a configuration, hereinafter referred to as modified structure, in which the terminal elements extend in the direction of stacking may be adopted as an example.

However, the modified structure contains a problem, as will be further explained below, due to significant heat dissipation from the terminal plates 7 contacting the fuel cell units 2a and 2b, specifically, significant heat dissipation at the locations from which the terminal elements extend.

FIG. 8 is a graph schematically showing an example of the relationship between the saturated water vapor pressure and the partial pressure of water vapor in the passage for the oxidizing gas, in which the dot-dash line indicates the partial pressure of water vapor, the broken line indicates the saturated water vapor pressure when the terminal plate 7 exhibits a uniform temperature distribution over its surface, and the solid line indicates the saturated water vapor pressure when the terminal element 9 is disposed on the terminal plate 7 so as to be closer to the exhaust end of the passage for the oxidizing gas than to the centerline of the terminal plate 7, which corresponds to the modified structure mentioned above.

FIG. 8 shows that water vapor may more likely be condensed at a location near the exhaust end of the passage for the oxidizing gas than other locations because the partial pressure of water vapor gradually increases toward the saturated water vapor pressure curve as the exhaust end along the passage for the oxidizing gas is approached.

As shown in FIG. 8, in the modified structure, water vapor may more likely be condensed at the location corresponding to the terminal element 9 because the saturated water vapor pressure, which is determined merely depending on temperature, locally decreases around the location corresponding to the terminal element 9.

When the saturated water vapor pressure becomes lower than the partial pressure of water vapor, water vapor condenses, and the condensed water covers the electrode's reaction surface as a water film. The water film inhibits the electrode's reaction surface from being supplied with sufficient oxidizing gas, which results in degrading of the power generation performance in the fuel cell units 2a and 2b.

On the other hand, the above problem due to the condensed water may be prevented by disposing the terminal element 9 at a location far from the exhaust end of the passage for the oxidizing gas; however, as shown in FIG. 9, the electric resistance is increased as the terminal element 9 is disposed farther from the centerline of the terminal plate 7.

Based on the above problems, an object of the present invention is to provide a fuel cell stack in which condensation of water vapor due to a local temperature drop in the end fuel cell units is prevented and the power generation performance of these fuel cell units is effectively maintained while preventing an increase in electric resistance.

In order to achieve the above object, the present invention provides the following.

A fuel stack (e.g., a fuel cell stack 11 in the embodiments) according to a first aspect of the present invention comprises: a plurality of fuel cell units (e.g., fuel cell units 15) stacked together in a direction of stacking each of which comprises an electrolyte element (e.g., a solid polymer electrolyte membrane 12), a pair of electrodes (e.g., an anode electrode 13 and a cathode electrode 14) holding the electrolyte element therebetween, and a pair of separators (e.g., separators 16 and 17) holding the electrodes therebetween; a pair of terminal plates (e.g., terminal plates 21) each of which is disposed outside an end fuel cell unit (e.g., end fuel cell units 15a and 15b) located at an end of the stacked fuel cell units; and a terminal element (e.g., a terminal element 36) extending outwardly in the direction of stacking from the outside surface of at least one of the terminal plates; wherein a location from which the terminal element extends is located within an area on the terminal plate, corresponding to an area in a passage for an oxidizing gas (e.g., a passage 19 for an oxidizing gas) formed in the end fuel cell unit disposed adjacent to the terminal element where the partial pressure of water vapor is lower than the saturated water vapor pressure.

In the fuel cell stack which has the above structure, condensation of water vapor due to a local reduction in the saturated water vapor pressure at the location corresponding to the terminal element may be prevented.

According to a second aspect of the present invention, in the fuel cell stack according to the first aspect, the location from which the terminal element extends is set within the area on the terminal plate so that the total electrical resistance of the terminal element and the terminal plate is minimized.

In the fuel cell stack which has the above structure, condensation of water vapor due to a local reduction in the saturated water vapor pressure at the location corresponding to the terminal element may be prevented, and an increase in electric resistance due to disposition of the terminal element away from the centerline of the terminal plate may also be prevented.

A fuel stack (e.g., the fuel cell stack 11 in the embodiments) according to a third aspect of the present invention comprises: a plurality of fuel cell units (e.g., the fuel cell units 15) stacked together in a direction of stacking each of which comprises an electrolyte element (e.g., the solid polymer electrolyte membrane 12), a pair of electrodes (e.g., the anode electrode 13 and the cathode electrode 14) holding the electrolyte element therebetween, and a pair of rectangular separators (e.g., the separators 16 and 17) holding the electrodes therebetween each of which includes an oxidizing gas exhaust communication port located adjacent to the short side of the rectangular separator; a pair of rectangular terminal plates (e.g., the terminal plates 21) each of which is disposed outside an end fuel cell unit (e.g., the end fuel cell units 15a and 15b) located at an end of the stacked fuel cells; and a terminal element (e.g., the terminal element 36) extending outwardly in the direction of stacking from the outside surface of at least one of the rectangular terminal plates; wherein a location from which the terminal element extends is located farther from the oxidizing gas exhaust communication port than is the centerline of the long side of the rectangular terminal plate.

In the fuel cell stack which has the above structure, because the terminal element is located at a location where the difference between the saturated water vapor pressure and the partial pressure of water vapor is large, condensation of water vapor due to a local reduction in the saturated water vapor pressure at the location corresponding to the terminal element may be prevented.

DETAILED DESCRIPTION OF THE PREFERRED EMBODIMENTS

The preferred embodiments of the present invention will be explained with reference to the accompanying drawings.

Figure 1:
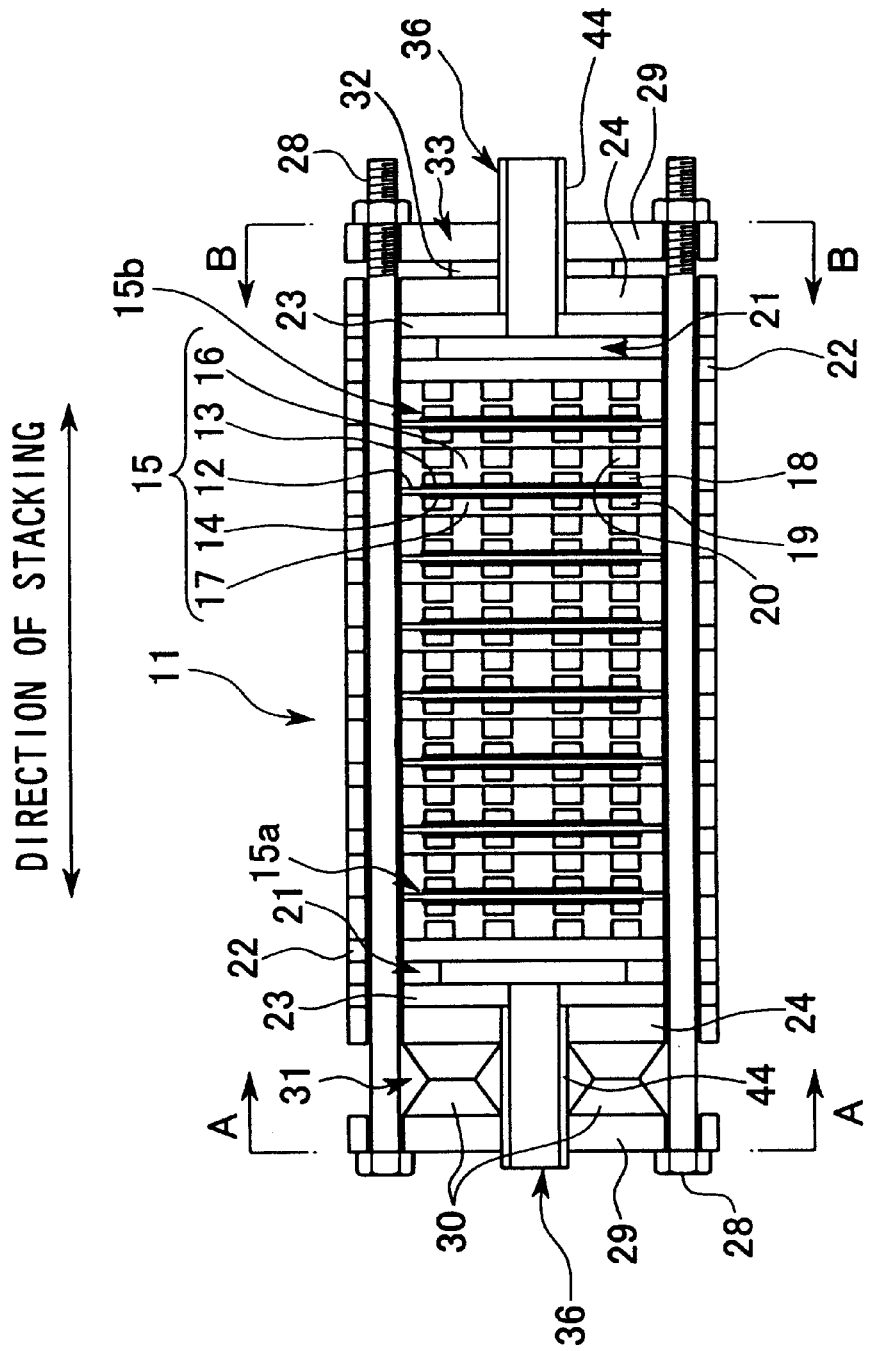
FIG. 1 is a front view showing an embodiment of a fuel cell stack according to the present invention.

In FIG. 1, reference symbol 11 indicates a fuel cell stack which is to be used in a vehicle.

The fuel cell stack 11 is a so-called solid polymer electrolyte fuel cell stack comprising a plurality of fuel cell units 15 stacked together in the horizontal direction each of which comprises a solid polymer electrolyte membrane 12, i.e., an electrolyte, an anode electrode 13 and a cathode electrode 14 which together hold the solid polymer electrolyte membrane 12 therebetween, and a pair of separators 16 and 17 holding the anode electrode 13 and the cathode electrode 14 therebetween.

Passages 18 for allowing a fuel gas, e.g., hydrogen, to flow are formed between the anode electrode 13 and the separator 16 adjacent to the anode electrode 13. Passages 19 for allowing an oxidizing gas, e.g., an oxygen-containing gas or air, to flow are formed between the cathode electrode 14 and the separator 17 adjacent to the cathode electrode 14.

In addition, passages 20 for a cooling medium are formed between the back sides of the separators 16 and 17, and the cooling medium, e.g., pure water, ethylene glycol, or oil, is supplied into the passages 20 for cooling the fuel cell units 15.

In FIG. 1, hatching to indicate cross-sections is not shown for the purpose of clarification.

In order to supply the above-mentioned hydrogen, air, and the cooling medium into each of the passages 18, 19, and 20, communication ports 25a, 25b, 26a, 26b, 27a, and 27b are each formed in the anode electrode 13 and the cathode electrode 14, each of which forms the fuel cell units 15, and in a terminal plate 21, a conductive plate 22, an insulation plate 23, and an end plate 24, described below. In other words, this fuel cell stack 11 is constructed as an internal manifold structure.

The stacked fuel cell units 15 are fastened together by stud bolts 28, and the conductive plates 22 for separating the cooling medium are disposed outside fuel cell units 15a and 15b respectively located at each end of the stacked fuel cell units 15 so as to contact the fuel cell units 15a and 15b.

The insulation plate 23, made of resin or the like, is disposed outside the conductive plate 22 located at one end (the left side in FIG. 1) of the fuel cell stack 11 via the below-mentioned terminal plate 21. Further outside the insulation plate 23, a fastening structure 31, including coned disc springs 30 disposed between the end plate 24 and a backup plate 29, is provided.

Figure 3:
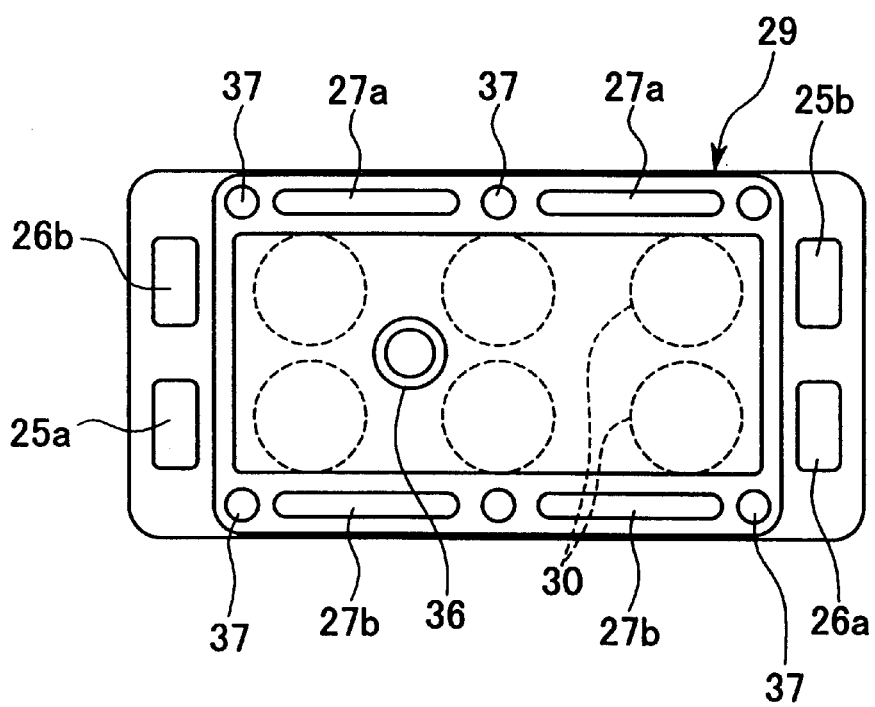
FIG. 3 is a cross-section taken along line A—A in FIG. 1.

As shown in FIG. 3 which is a cross-section taken along line A—A in FIG. 1, the coned disc springs 30 are symmetrically positioned on the backup plate 29, i.e., six coned disc springs 30 are disposed in two horizontal rows each of which includes three springs.

Another insulation plate 23, made of resin or the like, is disposed outside the conductive plate 22 located at the other end (the right side in FIG. 1) of the fuel cell stack 11 via the below-mentioned terminal plate 21. Further outside the insulation plate 23, a fastening structure 33, including washers 32 disposed between the end plate 24 and the backup plate 29, is provided.

Figure 4:
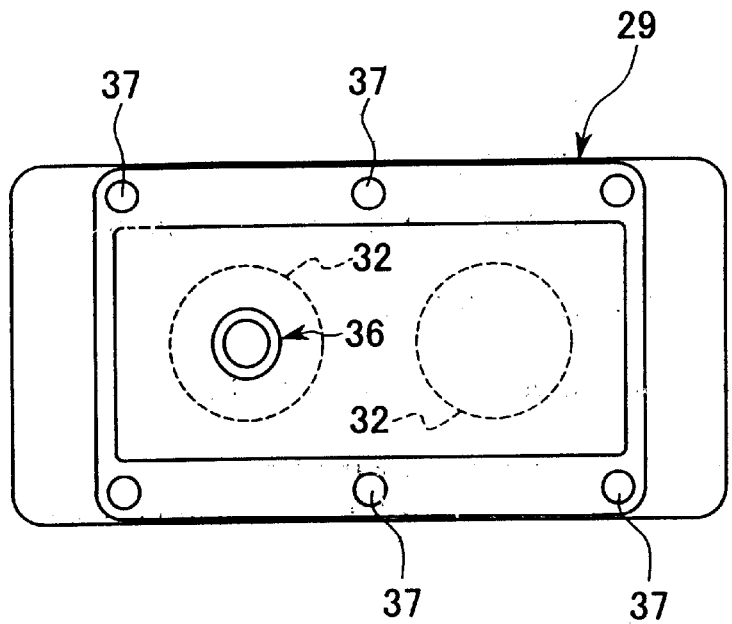
FIG. 4 is a cross-section taken along line B—B in FIG. 1.

As shown in FIG. 4 which is a cross-section taken along line B—B in FIG. 1, two of the washers 32 are disposed side by side in the horizontal direction on the backup plate 29, and a terminal element 36 extends through one of the washers 32.

Figure 6:
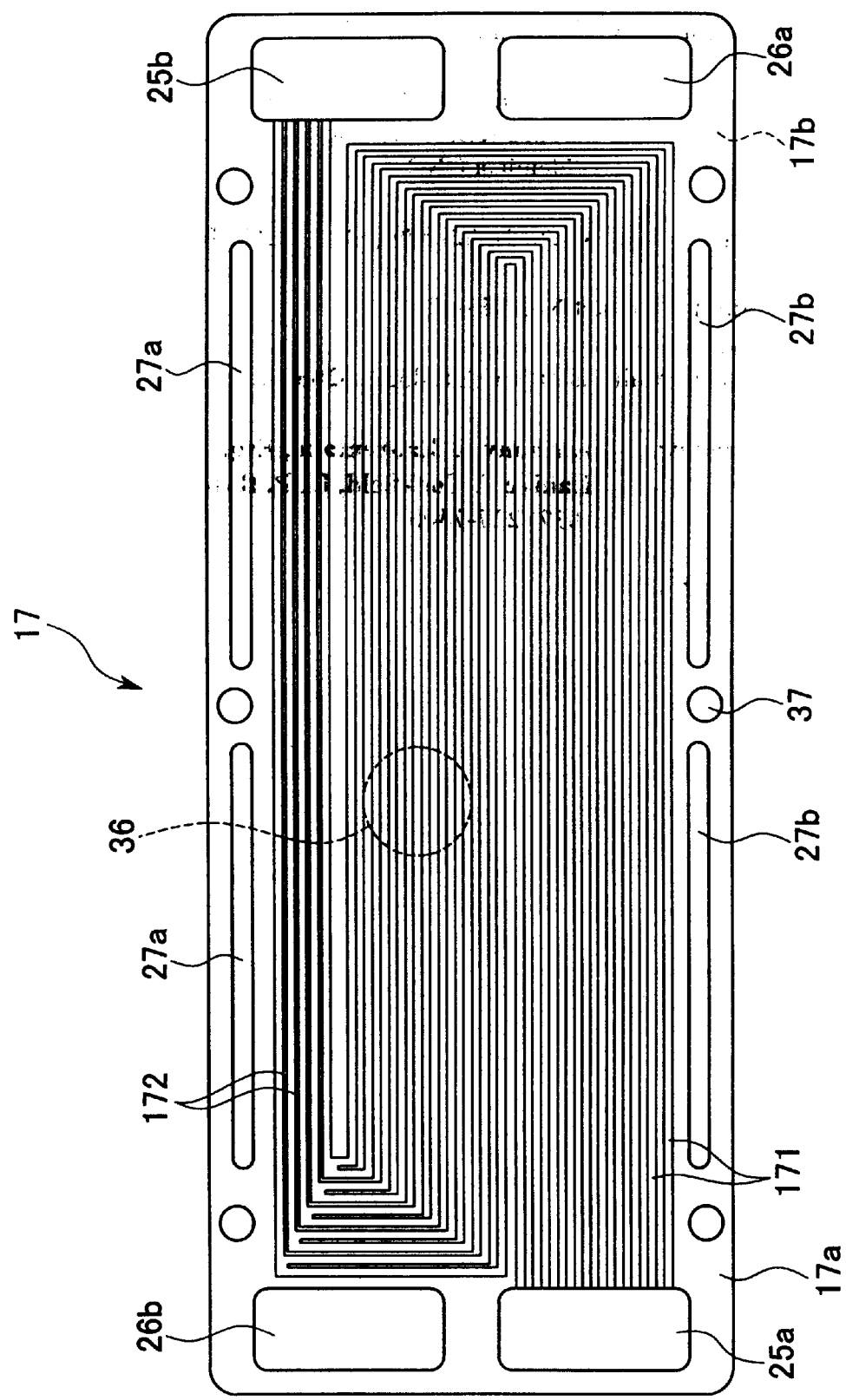
FIG. 6 is a plan view of the cathode side separator shown in FIG. 1.

The detailed configuration of the separator 17 disposed adjacent to the cathode electrode 14 will be explained below with reference to FIG. 6.

In the separator 17, a surface 17a facing the cathode electrode 14 and a backside surface 17b are formed having a rectangular shape whose long side is directed in the horizontal direction and whose short side is directed in the vertical direction.

The separator 17 is provided with: an oxidizing gas supply communication port 25a which allows the oxidizing gas to flow and which is formed in a vertically elongated shape in the lower-left area; a fuel gas supply communication port 26a which allows the fuel gas to flow and which is formed in a vertically elongated shape in the lower-right area; an oxidizing gas exhaust communication port 25b which is formed in a vertically elongated shape and which is located diagonally with respect to the oxidizing gas supply communication port 25a in the upper-right area; and a fuel gas exhaust communication port 26b which is formed in a vertically elongated shape and which is located diagonally with respect to the fuel gas supply communication port 26a in the upper-left area.

The separator 17 is also provided with: two cooling medium supply communication ports 27a which are disposed along the upper side of the rectangular separator and which are formed in a horizontally elongated shape; and two cooling medium exhaust communication ports 27b which are disposed along the lower side of the rectangular separator and which are formed in a horizontally elongated shape. The cooling medium is supplied into the cooling medium supply communication ports 27a during use.

The surface 17a of the separator 17 is provided with ten first passage grooves 171 for the oxidizing gas each of which is separated from the others and communicates with the oxidizing gas supply communication port 25a. The first passage grooves 171 are convergently connected to five second passage grooves 172 for the oxidizing gas which are separated from each other and which communicate with the oxidizing gas exhaust communication port 25b. The first and second passage grooves 171 and 172 together form a serpentine shape with one-and-a-half alternating turns on the surface 17a of the separator 17.

Because the oxidizing gas is gradually reduced as the oxidizing reaction progresses, the first and second passage grooves 171 and 172 are formed in a so-called single elimination tournament manner in which the number of second passage grooves 172 is less than that of the first passage grooves 171 (reduced from 10 to 5) so that the passages become narrower as the exhaust end is approached; thus, the surface 17a of the separator 17 is effectively used.

The first and second passage grooves 171 and 172 are closed by the cathode electrode 14 to form the above-mentioned passage 19 for the oxidizing gas.

The oxidizing gas supplied into the oxidizing gas supply communication port 25a flows into the first passage grooves 171, flows in a serpentine manner to the second passage grooves 172, and exits from the oxidizing gas exhaust communication port 25b.

As described above, because the passage 19 is formed in a serpentine shape and in the converging tournament manner, the oxidizing gas travels along longer passages as compared to the case in which passages are horizontally formed parallel to the long side of the separator 17; therefore, the oxidizing gas can be effectively utilized and a high power generation efficiency can be obtained.

On the other hand, the surface of the separator 16 which faces the anode electrode 13 is also provided with first and second passage grooves for the fuel gas (not shown) which form a serpentine shape with one-and-a-half alternating turns like the first and second passage grooves 171 and 172 for the oxidizing gas formed on the surface 17a of the separator 17; however, these passage grooves for the fuel gas will not be explained.

The detailed configuration of the terminal plate 21 will be explained below with reference to FIG. 2.

Only one of the two terminal plates 21 disposed at the ends of the fuel cell stack 11 will be explained herein since these terminal plates 21 are identical.

The terminal plate 21 is formed having a rectangular shape like the separators 16 and 17, and one surface thereof makes conductive contact with the conductive plate 22 disposed outside the fuel cell units 15a and 15b located at the ends of the fuel cell stack 11 so that generated electricity can be output.

The terminal plate 21 comprises an insulation element 34, made of a resin, for example, along the periphery thereof, and a rectangular plate 35 made of copper so as to exhibit a high conductivity in the center portion thereof The insulation element 34 is provided with: the oxidizing gas supply communication port 25a and the oxidizing gas exhaust communication port 25b which are disposed in a diagonal relationship with each other; the fuel gas supply communication port 26a and the fuel gas exhaust communication port 26b which are disposed in diagonal relationship with each other; and the cooling medium communication ports 27a and 27b which are respectively disposed in the upper portion and in the lower portion between through holes 37 for the stud bolts 28 formed therein.

Figure 2:
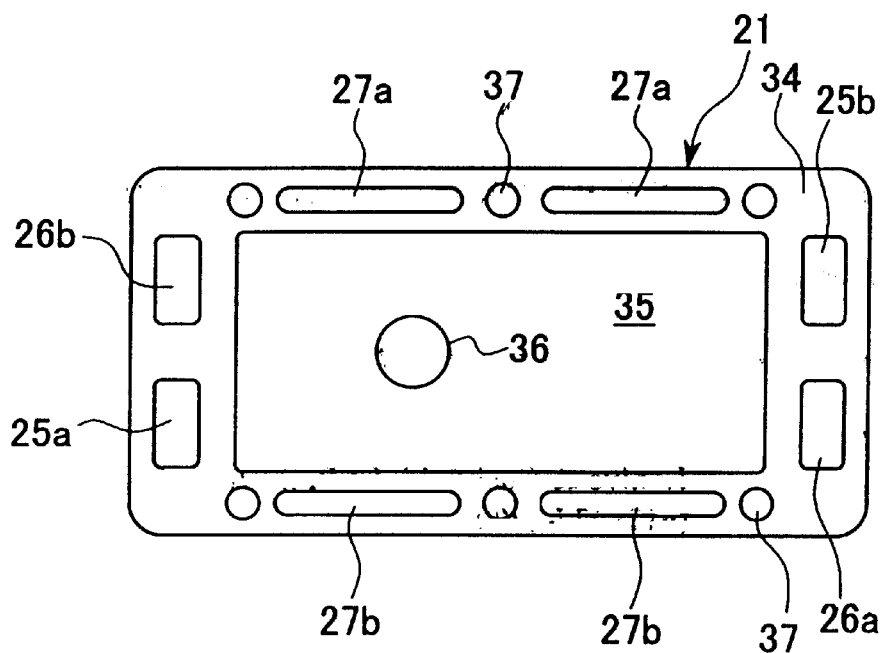
FIG. 2 is a plan view of the terminal plate shown in FIG. 1.

The terminal element 36 extending out of the plane of FIG. 2, i.e., extending in the direction along which the fuel cell units 15 are stacked, is located at the middle height of the plate 35 and at a position which is offset from the centerline of the plate 35 in the horizontal direction, i.e., in the right-and-left direction in FIG. 2.

In other words, the terminal element 36 is located farther from the oxidizing gas exhaust communication port 25b than is the centerline of the long side of the terminal plate 21.

Figure 9:
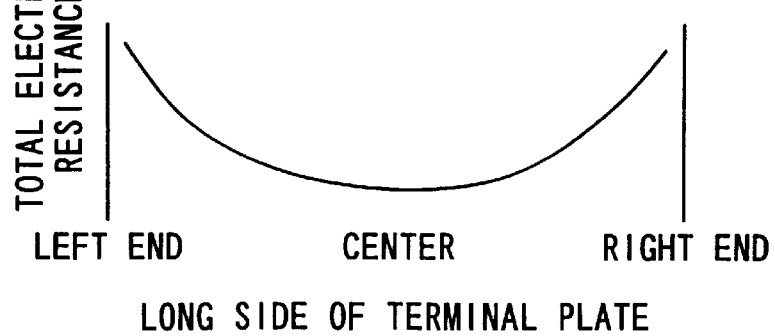
FIG. 9 is a graph schematically showing the relationship between the location of the terminal element (represented on the horizontal axis) and the total electrical resistance (represented on the vertical axis) of the terminal element and the terminal plate.

The terminal element 36 is located within an area (e.g., the hatched area in FIG. 5) on the terminal plate 21 corresponding to an area in the first passage grooves 171 located at the exhaust side of the passage 19 for the oxidizing gas where the partial pressure of water vapor is lower than the saturated water vapor pressure during use under the operational conditions of the fuel cell stack 11, for example, as described below. The terminal element 36 is also located as close to the centerline of the terminal plate 21 as possible so that the total electrical resistance (as represented on the vertical axis in FIG. 9) of the terminal element 36 and the terminal plate 21 is minimized.

An example of the operational conditions for the fuel cell stack 11 is as follows.
(1) Hydrogen
  Supplied gas temperature: 70 to 80° C.
  Supplied gas dew-point: 60 to 70° C.
  Pressure: 100 to 200 kPa
(2) Air
  Supplied gas temperature: 70 to 80° C.
  Supplied gas dew-point: 60 to 70° C.
  Pressure: 100 to 200 kPa
(3) Output current density: 500 to 1200 mA/cm$^2$ When the fuel cell stack 11 is operated under temperature conditions which make the saturated water vapor pressure relatively low as indicated by reference symbol L in FIG. 7, the terminal element 36 should be located within the area T where a drop portion $L_{a1}$ of the saturated water vapor pressure curve L (shown by a solid line) is above the partial pressure of water vapor (shown by a dot-dash line) and at the position where the total electrical resistance of the terminal element 36 and the terminal plate 21 is minimized, i.e., at the position $T_1$ which is closest to the centerline of the terminal plate 21 in the area T, in order to prevent water vapor condensation which occurs if a drop portion $L_{a2}$ (shown by a broken line) of the saturated water vapor pressure curve L protrudes below the partial pressure of water vapor (shown by a dot-dash line).

Figure 7:
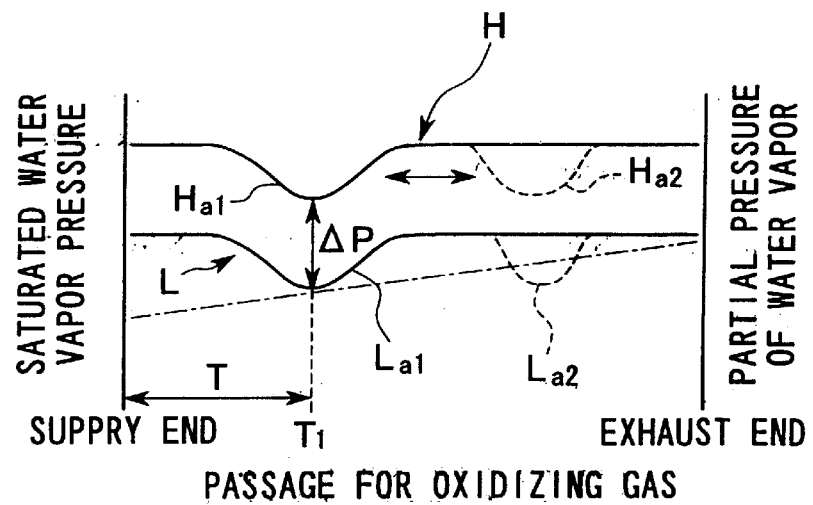
FIG. 7 is a graph schematically showing the relationship between the saturated water vapor pressure (represented on the left vertical axis) and the partial pressure of water vapor (represented on the right vertical axis) in the passage for the oxidizing gas (represented on the horizontal axis).
Figure 8:
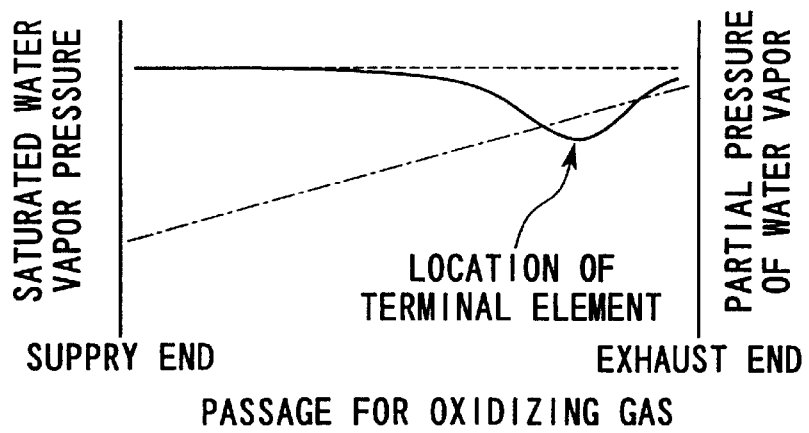
FIG. 8 is a graph schematically showing the relationship between the saturated water vapor pressure (represented on the left vertical axis) and the partial pressure of water vapor (represented on the right vertical axis) in the passage for the oxidizing gas (represented on the horizontal axis), and showing that the saturated water vapor pressure locally decreases at the location where the terminal element is disposed.

When the fuel cell stack 11 is operated under temperature conditions which make the saturated water vapor pressure relatively high as indicated by reference symbol H in FIG. 7, the terminal element 36 may be located at the centerline of the terminal plate 21 where the total electrical resistance of the terminal element 36 and the terminal plate 21 is minimized, because a drop portion $H_{a1}$ (shown by a solid line) or $H_{a2}$ (shown by a broken line) of the saturated water vapor pressure curve H is always above the partial pressure of water vapor (shown by a dot-dash line) regardless of the position of the terminal element 36 on the terminal plate 21.

Figure 5:
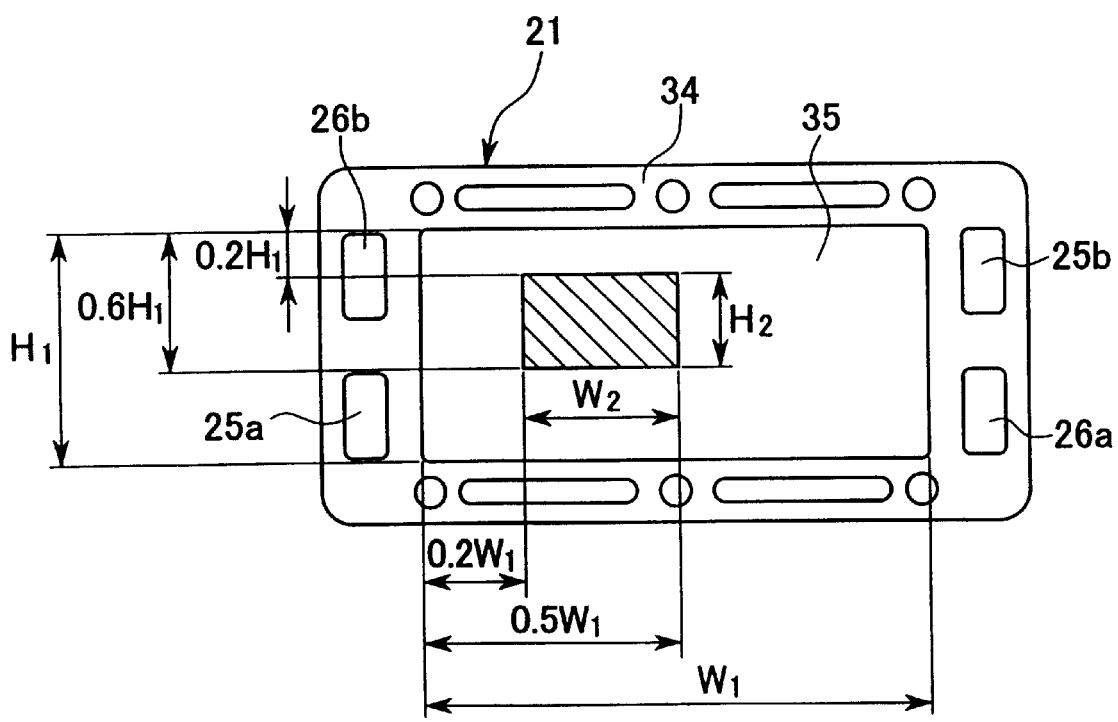
FIG. 5 schematically shows the terminal plate shown in FIG. 1 in order to show an area indicated by hatching where the center of the terminal element may be located.

FIG. 5 is a plan view showing the area (the hatched area) within which the terminal element 36 may be preferably disposed so that water vapor condensation and an increase in the total electrical resistance can be prevented.

As shown in FIG. 5, the terminal element 36 may be disposed in the rectangular area whose height and width are shown as $H_2$ and $W_2$, respectively. When the height and width of the periphery of the electrode's reaction surface (i.e., the periphery of the plate 35 made of copper in FIG. 5) of the anode electrode 13 and the cathode electrode 14 are respectively defined as $H_1$ and $W_1$, the position of the upper edge and the lower edge of the rectangular area are respectively set to be $0.2H_1$ and $0.6H_1$ from the upper end of the electrode's reaction surface, i.e., the height $H_2$ equals to $0.4H_1$, and the position of the left edge and the right edge of the rectangular area are respectively set to be $0.2 W_1$ and $0.5 W_1$ from the left end of the electrode's reaction surface, i.e., the width $W_2$ equals $0.3W_1$.

The rectangular area in which the center of the terminal element 36 may be disposed is slightly shifted toward the upper end because the passage 19 for the oxidizing gas is formed in a tournament manner in which the number of the passage grooves are reduced toward the exhaust end.

In the fuel cell stack 11 which has the above-mentioned configuration, because the terminal element 36 is disposed at the location where the difference Δ P between the saturated water vapor pressure and the partial pressure of water vapor is large, as shown in FIG. 7, condensation of water vapor due to a local reduction in the saturated water vapor pressure H at the location corresponding to the terminal element 36 may be prevented; consequently, degradation in the electric power generation performance in the fuel cell units 15a and 15b may be prevented.

Specifically, in the fuel cell stack 11 according to this embodiment, because the width of the passage 19 for the oxidizing gas is configured to be narrower toward the exhaust end (i.e., a tournament manner), the advantageous effect of preventing condensation of water vapor is more noticeably apparent as compared to the case in which the width of the passage 19 for the oxidizing gas is configured to be constant from the supply end to the exhaust end.

In addition, because the passage 19 is formed in a serpentine shape and the width thereof is configured to be narrow as compared to the case in which passages are horizontally formed parallel to the long side of the separator 16 or 17, more oxidizing gas flows through the area corresponding to the terminal element 36 than in the latter case; therefore, the advantageous effect of preventing condensation of water vapor due to a local reduction in the saturated water vapor pressure H at the location corresponding to the terminal element 36 is more noticeably apparent.

Furthermore, because the terminal element 36 is disposed in the area (the hatched area in FIG. 5) in which the partial pressure of water vapor in the passage 19 of the oxidizing gas is below the saturated water vapor pressure, and at the position at which the total electrical resistance of the terminal element 36 and the terminal plate 21 is minimized, not only condensation of water vapor due to a local reduction in the saturated water vapor pressure at the location corresponding to the terminal element 36, but also an increase in the total electrical resistance due to the terminal element 36 located with an offset from the centerline of the terminal plate 21 may be prevented.

The present invention is not limited to the above embodiment.

Although the passage 18 for the fuel gas in the separator 16 and the passage 19 for the oxidizing gas in the separator 17 are configured in a serpentine shape in the above embodiment, alternatively, the passages 18 and 19 may be configured in a straight line longitudinally extending (i.e., extending in the horizontal direction in FIG. 6) from one short side to the other short side.

Figure 10:
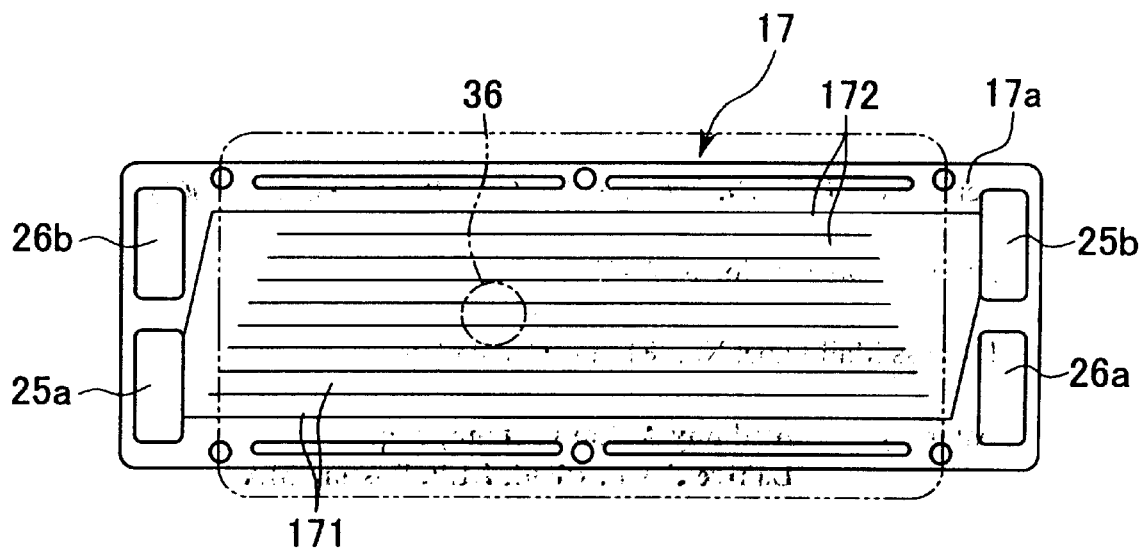
FIG. 10 is a plan view of another embodiment.

In this case, if the separator is configured so as to have the same surface area as that of the separators 16 and 17 in the above embodiment, but to have a more elongated shape as shown in FIG. 10, the width of the passage for the oxidizing gas becomes relatively narrower; therefore, the advantageous effect of preventing condensation of water vapor is more noticeably apparent as in the above embodiment in which the passage 19 for the oxidizing gas is formed in a serpentine shape.

Because the other elements and operations are the same as in the foregoing embodiments, the same reference symbols are used for the same elements and a description thereof will be omitted.

Although the terminal plate 21 in the above embodiment comprises the insulation element 34 made of a resin or the like along the periphery thereof, and the plate 35 made of copper so as to exhibit a high conductivity in the center portion thereof, alternatively, the terminal plate 21 may be a copper plate, and the plate 35 may extend to the periphery of the terminal plate 21.

Although the cross-section of the terminal element 36 in the above embodiment has a circular shape, the cross-section may have a rectangular shape or a polygonal shape.

Figure 11:
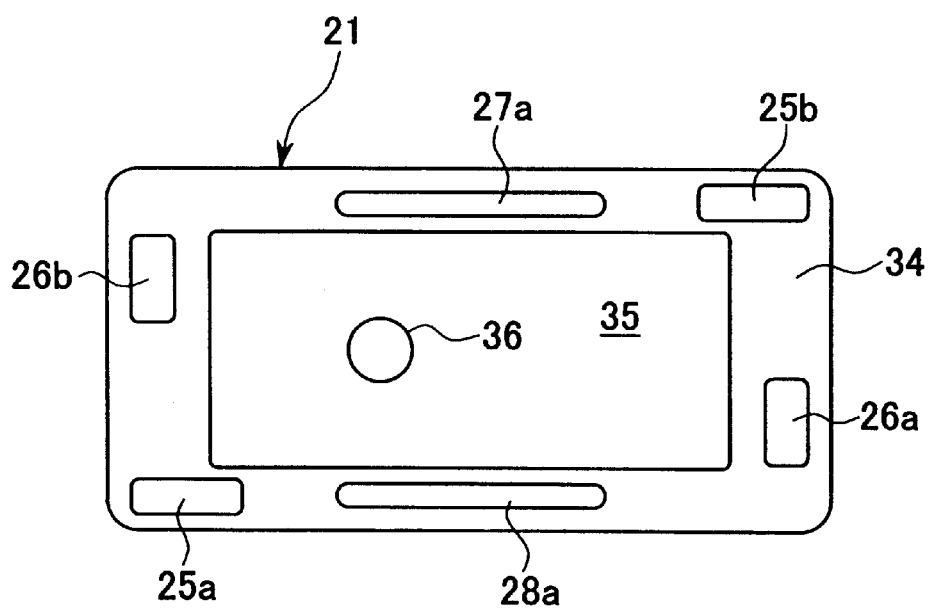
FIG. 11 is a plan view of yet another embodiment.
Figure 12:
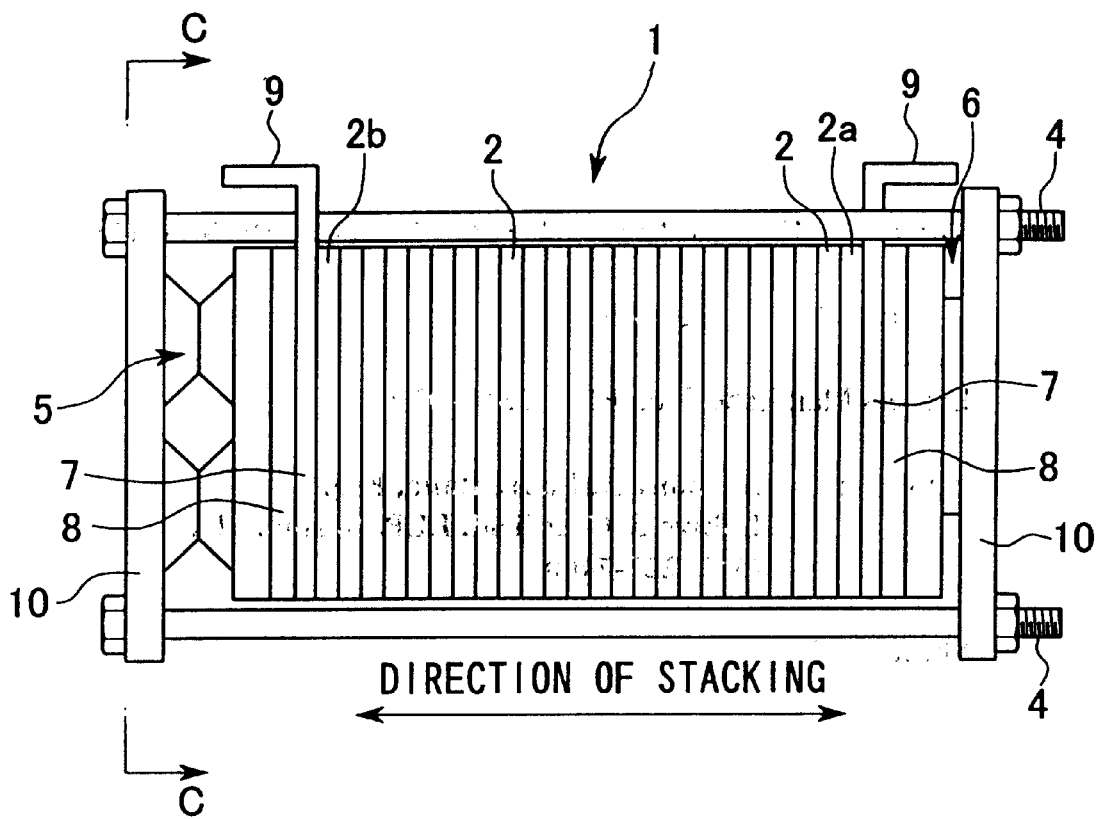
FIG. 12 is a front view showing a conventional fuel cell stack.

Although, in the above embodiment, the separators 16 and 17 are provided with the communication ports 25a, 25b, 26a, and 26b which are located near the short sides and which are formed in a shape elongated along the short side of the rectangular separators 16 and 17, the communication ports 25a and 25b located near the short sides may be formed in a shape elongated along the long side of the rectangular separators 16 and 17, as shown in FIG. 11. In this case, it is acceptable if the separators 16 and 17 are not provided with the through holes 37 for the stud bolts, and the fuel cell units may be fastened together by other fastening means.

Because the other elements and operations are the same as in the foregoing embodiments, the same reference symbols are used for the same elements and a description thereof will be omitted.

It is obvious from the foregoing description that the present invention will provide the following advantageous effects.

(1) According to the first aspect of the present invention, condensation of water vapor due to a local reduction in the saturated water vapor pressure at the location corresponding to the terminal element may be effectively prevented, and degradation in the electric power generation performance in the fuel cell units located at the ends of the stack may be prevented.

(2) According to the second aspect of the present invention, not only condensation of water vapor due to a local reduction in the saturated water vapor pressure at the location corresponding to the terminal element, but also an increase in the total electrical resistance due to the terminal element located with an offset from the centerline of the terminal plate may be prevented.

(3) According to the third aspect of the present invention, because the terminal element is located at a location where the difference between the saturated water vapor pressure and the partial pressure of water vapor is large, condensation of water vapor due to a local reduction in the saturated water vapor pressure at the location corresponding to the terminal element may be effectively prevented, and degradation in the electric power generation performance in the fuel cell units located at the ends of the stack may be prevented.

What is claimed is:

1. A solid polymer electrolyte membrane fuel stack comprising:

a plurality of fuel cell units stacked together in a direction of stacking each of which comprises a solid polymer electrolyte membrane, a pair of electrodes holding said solid polymer electrolyte membrane therebetween, and a pair of separators holding said electrodes therebetween;

a pair of terminal plates each of which is disposed outside an end fuel cell unit located at an end of said stacked fuel cell units; and a terminal element extending outwardly in said direction of stacking from an outside surface of at least one of said terminal plates;

wherein a location from which said terminal element extends is located within an area on said terminal plate, said area corresponding to an area in a passage for an oxidizing gas formed in said end fuel cell unit disposed adjacent to said terminal element and wherein a partial pressure of water vapor at said location is lower than a saturated water vapor pressure at said location.

2. A solid polymer electrolyte membrane fuel cell stack according to claim 1, wherein said location from which said terminal element extends is set within said area on said terminal plate so that a total electrical resistance of said terminal element and said terminal plate is minimized.

3. A solid polymer electrolyte membrane fuel stack comprising:

a plurality of fuel cell units stacked together in a direction of stacking each of which comprises a solid polymer electrolyte membrane, a pair of electrodes holding said solid polymer electrolyte membrane therebetween, and a pair of rectangular separators holding said electrodes therebetween each of which includes an oxidizing gas exhaust communication port located adjacent to a short side of said rectangular separator;

a pair of rectangular terminal plates each of which is disposed outside an end fuel cell unit located at an end of said stacked fuel cells; and a terminal element extending outwardly in said direction of stacking from an outside surface of at least one of said rectangular terminal plates;

wherein a location from which said terminal element extends is located farther from said oxidizing gas exhaust communication port than is the centerline of a long side of said rectangular terminal plate.

4. A solid polymer electrolyte membrane fuel cell stack according to claim 1, wherein said saturated water vapor pressure at said location depends on heat dissipation at said terminal element.

5. A solid polymer electrolyte membrane fuel cell stack according to claim 1, wherein said saturated water vapor pressure at said location is lower than saturated water vapor pressures at other locations in said terminal plate.

6. A solid polymer electrolyte membrane fuel cell stack according to claim 1, wherein said saturated water vapor pressure at said location is lower than saturated water vapor pressures at other locations in said terminal plate.

7. A solid polymer electrolyte membrane fuel cell stack according to claim 1, wherein said location is determined in said terminal plate to prevent condensation of water vapor at said location.

8. A solid polymer electrolyte membrane fuel cell stack according to claim 2, wherein said terminal element is located close to a center of said terminal plate so that a total electrical resistance of said terminal element and said terminal plate is reduced.

9. A solid polymer electrolyte membrane fuel cell stack according to claim 1, wherein said passage for the oxidizing gas is formed in a tournament manner in which a number of passage grooves are reduced toward an exhaust end of said passage.

10. A solid polymer electrolyte membrane fuel cell stack according to claim 9, wherein said passage for the oxidizing gas is formed in a serpentine shape to increase efficiency of said stack.

* * * * *

UNITED STATES PATENT AND TRADEMARK OFFICE
CERTIFICATE OF CORRECTION

PATENT NO. : 6,723,463 B2
DATED : April 20, 2004
INVENTOR(S) : Sugita et al.

It is certified that error appears in the above-identified patent and that said Letters Patent is hereby corrected as shown below:

<u>Title page,</u>
Item [73], Assignee, replace "Honda Giken Kabushiki Kaisha" with -- Honda Giken Kogyo Kabushiki Kaisha --.

Signed and Sealed this

Fifth Day of October, 2004

JON W. DUDAS
*Director of the United States Patent and Trademark Office*